United States Patent [19]

Engelmann et al.

[11] Patent Number: 4,959,164
[45] Date of Patent: Sep. 25, 1990

[54] ROCK FRAGMENTATION METHOD

[75] Inventors: William H. Engelmann, Minneapolis; Pamela J. Watson, Inver Grove Heights; Patrick A. Tuzinski, Minneapolis; John E. Pahlman, Bloomington; Sanaa E. Khalafalla, Minneapolis, all of Minn.

[73] Assignee: The United States of America as represented by the Secretary of the Interior, Washington, D.C.

[21] Appl. No.: 211,650

[22] Filed: Jun. 27, 1988

[51] Int. Cl.$^5$ .............................. C09K 7/02
[52] U.S. Cl. .................... 252/8.51; 175/46; 51/322; 82/900; 125/11.22
[58] Field of Search ............ 252/8.51; 175/46, 50; 166/250; 51/322; 82/900; 125/11 CS

[56] References Cited

U.S. PATENT DOCUMENTS

| 2,589,949 | 3/1952 | Meadors | 252/8.51 |
|---|---|---|---|
| 2,829,430 | 4/1958 | Toulmin, Jr. | 29/424 |
| 3,520,313 | 7/1970 | Seymour | 166/308 X |
| 3,663,477 | 5/1972 | Ahearn | 252/311.5 |
| 3,720,216 | 3/1973 | Wartman et al. | 137/13 |
| 3,747,681 | 7/1973 | Davis, Jr. et al. | 166/307 |
| 3,836,465 | 9/1974 | Rhudy et al. | 252/8.5 |
| 3,836,565 | 9/1974 | Rhudy et al. | 558/305 |
| 3,922,821 | 12/1975 | Canterbury | 51/322 X |
| 4,316,811 | 2/1982 | Burns et al. | 252/88 |
| 4,507,210 | 3/1985 | Lauzon | 252/8.51 |
| 4,765,415 | 8/1988 | Khalafalla et al. | 175/50 |
| 4,830,765 | 5/1989 | Perricone et al. | 252/8.51 |

OTHER PUBLICATIONS

Mondshine, *Oil and Gas Journal* (Dec. 7, 1970), pp. 70–77.

Primary Examiner—Richard D. Lovering
Assistant Examiner—Gary L. Geist
Attorney, Agent, or Firm—E. Philip Koltos

[57] ABSTRACT

The enhancement of rock fragmentation and rock excavation by neutralizing the rock surface charge with respect to the drilling, tunneling, cutting, grinding, or polishing fluid. Water-soluble, high-molecular-weight, nonionic polymers are employed to neutralize the surface charge on the rock, thereby promoting increased drilling, cutting, tunneling, grinding and polishing performance resulting in increases in drilling, tunneling, cutting, grinding and polishing penetration rate, extensions in bit, cutting tool, grinding media, and polishing tool life and dust suppression.

5 Claims, 7 Drawing Sheets

ROCK FRAGMENTATION METHOD

BACKGROUND OF THE INVENTION

The invention pertains to drilling and rock excavation as well as drilling for exploration, for mining or mineral development and for sampling and monitoring wells, and for gas, oil, and water wells. In addition, the mining industry, the dimension stone industry, the construction industry, the oil and gas industry, and any other industries that are involved in the drilling, cutting, and grinding of rock, coal, or concrete or in tunneling through rock may utilize this invention. Furthermore, the invention should also be applicable to the cutting, drilling, and grinding of other materials including metals, ceramics, other refractory materials, and also biological caries as in dental drilling of teeth.

Drilling and rock excavation represent a significant segment of the total mining system, and yearly drilling costs for five segments of the mining industry, namely copper/molybdenum, iron/titanium, lead/zinc, gold/silver, and crushed/dimension stone in the United States are about 1.5 billion dollars.

Drill bit costs represent about 600 million dollars per year or about 40 percent of the total drilling costs. Increasing the bit life by 100 percent can translate into yearly savings of 300 million dollars in drill bit costs.

Significant savings could be achieved if a method is devised for greatly enhancing the total penetration and the penetration rate of rock drilling and tunneling systems as well as greatly enhancing the rate of cutting and grinding of rocks while simultaneously extending the life of the bits, cutting tools and grinding media.

Therefore, significant savings could be realized in general drilling costs if a method is devised which allows increased drilling rates at constant applied mechanical stress during the drilling or tunneling, but prevents bit or blade wear.

Known in the prior art are methods of maintaining the properties and parameters of a drilling fluid by introducing chemical agents into the drilling fluid while it circulates in a well. Mamadzhanov et al in U.S. Pat. No. 4,410,052, issued Oct. 18, 1983, maintain the well integrity by adjusting the redox potential of the flushing fluid to the value determined at the moment of tapping the bed rock. This eliminates the ion exchange reactions between the bed walls and the flushing fluid and therefore maintains the natural permeability of the oil or gas productive well. This method is not concerned with enhancing drilling for excavation. Mamadzhanov et al in U.S. Pat. No. 4,385,666, issued May 31 1983, maintain and control the properties and parameters of drilling muds by adjusting their oxidation/reduction potential (redox) at preset values. This is done to maintain the rheological stability of the drilling mud which often gets diluted and changed in composition by ion exchange reactions in deep oil and gas well drilling and not to enhance the drilling rate or prolonging the drill bit life. Alekhin et al in U.S. Pat. No. 4,342,222, issued Aug. 3, 1982, used the redox potential of the drilling mud to determine the depth of a fluid-saturated stratum and the type of fluid such as mineralized water, oil, or gas released. Mixing the drilling mud with any of these fluid types changes its redox potential in a given direction, which identifies the nature of the fluid. This does not effect enhanced drilling productivity. Johnson and Kelly in U.S. Pat. No. 3,307,625, issued Mar. 7, 1967, pertains to wells formed when a subsurface source of hydrogen sulfide ($H_2S$) is encountered. Liberation of $H_2S$ (a weak acid) can lower the pH of water to a point where the drill metal starts to corrode. To prevent this corrosion, they added an alkali metal hydroxide or sulfide, e.g., NaOH or $Na_2S$ to raise the pH of the drilling fluid to the 7 to 9 range. None of the prior art mentioned above are pertinent to increasing drilling productivity.

It has been found that maximum increases in penetration can be obtained simultaneously with maximum increases in bit life using concentrations of chemical additive solutions, such as cationic organic surfactant and inorganic salt solutions, that neutralize the naturally-occurring negative charge on the rock surface, thereby producing a zero zeta potential or zero surface charge (ZSC) condition (cf., Engelmann,W.H., P.J. Watson, P.A. Tuzinski, and J.E. Pahlman. Zeta Potential Control for Simultaneous Enhancement of Penetration Rates and Bit Life in Rock Drilling. BuMines RI 9103, 1987, 24pp, and Zeta Potential Control for Enhancement Drilling of Taconite and Other Hard Rocks, Proceedings of the 60th Annual Meeting of the Minnesota Section, AIME and 48th Annual Mining Symposium, pp.6-1 to 6-22; and Khalafalla, S. E., W. H. Engelmann, and J. E. Pahlman. Isoelectric Drilling Method. U.S. Pat. Application Ser. No. 5,041, filed Jan. 15, 1987, now U.S. Pat. No. 4,765,415.)

The present invention provides a means for enhancing drilling rates while also prolonging the bit life at constant applied mechanical stress during drilling operations. This is accomplished by virtue of the invention's discovery that enhanced drilling rates are a function of the rock surface condition, and that, if the rock surface is maintained at the zero point of charge (ZPC), or zero surface charge (ZSC) condition, regardless of the salt type or concentration or water source, enhanced drilling rates coupled with prolongation of the bit life are attained. It has now been determined that water-soluble, nonionic, high-molecular-weight, organic polymers such as the polyalkene oxide class of polymers like polyethylene oxide (PEO) also are able to produce the ZSC condition.

SUMMARY OF THE INVENTION

It is an object of the present invention to provide a method of enhancing rock fragmentation in drilling, cutting, tunneling, and grinding at constant applied mechanical stress while also prolonging the life of the bits, cutting tools, and grinding media.

A further object of the invention is to provide a drilling, cutting, tunneling and grinding fluid which produces a zero surface charge condition on the working surface.

It is a further object to provide a drilling, cutting, tunneling, grinding, and polishing fluid with a nominally nonionic, high-molecular-weight, water soluble polymer to produce favorable ZSC conditions over a wide range of concentrations to increase penetration rates and extend the life of bits, cutting tools, grinding media, and polishing tools.

DETAILED DESCRIPTION OF THE INVENTION

Figure 1:
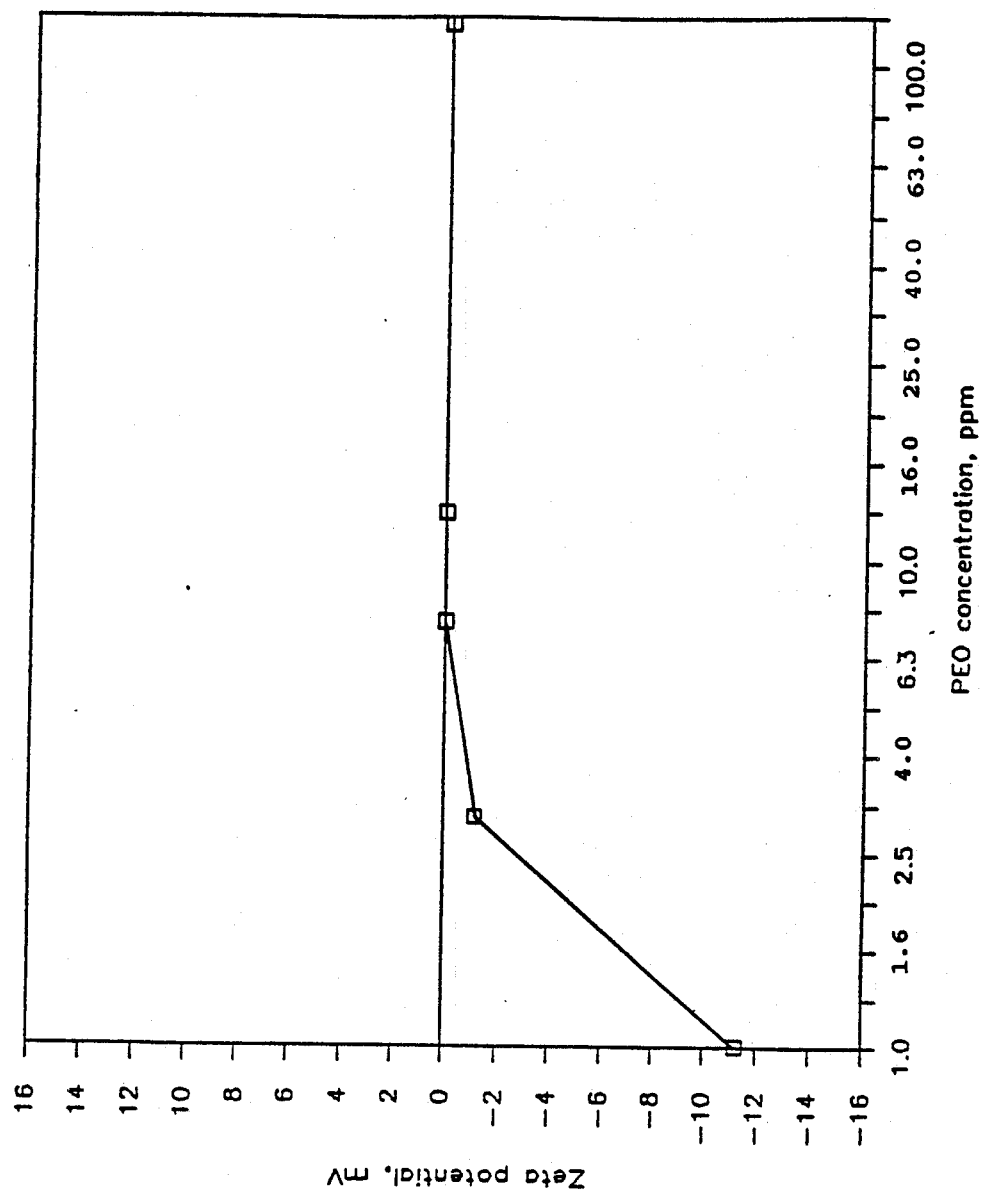
FIG. 1. shows the variation of zeta potential with additive concentrations for Sioux Quartzite in PEO solutions.

In the drilling procedures utilized by most drillers, they prefer to drill dry, i.e., using air flushing to remove rock particles, however, they actually drill with air containing a water mist for suppression of the accompanying undesirable large amounts of generated dust.

In the present and previous research it was discovered that the laboratory results were very sensitive to the chemical makeup of the water used in the drilling tests with cationic additives. For a given batch of distilled, deionized water, drilling data were reasonably reproducible and the data trends remained the same from one batch of distilled water to another. The use of mine water and municipal tap water in zeta potential determinations and additive drilling tests showed that the presence of anions in these waters greatly affected the concentration of the chemical additive required to neutralize the negative rock surface charge since these anions also affect the equilibrium of the electric double layer at the rock/solution interface. Thus, prescribed concentrations of salts for enhanced drilling conditions, such as those given in the literature, can be misleading if the chemical makeup of the water is not taken into consideration. The present invention reveals that the underlying principle for enhanced drilling is that the ZSC condition has to be maintained on the rock surface regardless of the water source chemistry.

A nominally nonionic, high-molecular-weight, water-soluble polymer is able to produce the favorable ZSC condition over a wide range of concentrations, and the use of this polymer in any of these concentrations results in penetration rates and bit life extensions that are two to three times greater than those previously found for inorganic salts and cationic surfactants, thereby making the polymer more beneficial and better adaptable to conventional drilling practices. Use of ZSC concentration solutions of water-soluble, high-molecular-weight, nonionic polymer as fluids in rock cutting, tunneling, and grinding operations can also enhance cutting, tunneling, and grinding performance. Employing any ZSC concentration solution of the nonionic polymer as the fluid in drilling, cutting, grinding, or tunneling means that an auxiliary system and set of procedures to monitor the concentration of the additive in fluid recycled in these processes is obviated since there is not a singular ZSC concentration when using the nonionic polymer but a continuous range of ZSC concentrations each of which will result in enhanced drilling, cutting, tunneling, and grinding.

Specifically, the invention accomplishes enhanced chemical fragmentation of rock by adding amounts of a water-soluble, nonionic polymer, such as polyethylene oxide (PEO), to the flushing or grinding fluid to attain the ZSC condition. The range of solution concentrations which produce the ZSC condition for a given water and rock type are determined using a commercial zeta potential determining apparatus.

When employing a cationic additive such as an inorganic salt, a cationic surfactant, or a cationic polymer as the surface charge modifier, the surface charge of rock particles in various concentrations of these additive solutions, was initially negative with increasing additive concentration until it was zero, and then was positive at higher additive concentrations. For each additive, the maximum drilling performance was obtained with the singular solution concentration that produced the ZSC condition, i.e., when the zeta potential was zero.

PEO is unusual as a surface charge modifier. It was initially tested as a drilling fluid additive because of its ability to flocculate particulates over a wide range of concentrations. Thus, drilling with concentrations of PEO solutions in the wide range of flocculating concentrations would indicate whether the enhanced drilling performance at the ZSC condition with cationic additives was due in part to drilling particulate flocculation. Since it was nonionic, PEO was not expected to neutralize the rock surface charge. In fact, zeta potential determinations of rock particles in low-molecular-weight, nonionic surfactants showed that they had no effect on the surface charge of the rock particles. Zeta potential determinations of rock particles in solutions of ever-increasing PEO concentration however, showed that PEO, like the cationic additives, brought the zeta potential from an initial negative value to zero but, unlike the cationic additives, did not produce a positive zeta potential at higher concentrations. Instead, at higher PEO concentrations the zeta potential remained at zero, i.e., the ZSC condition was maintained. The ability of PEO to neutralize the rock surface charge then must be due to the electronegativity differences in the ethylene oxide units of the PEO molecule.

There is evidence to suggest that PEO is hydrated in aqueous solution. This specific interaction may be a consequence of hydrogen bonding between water molecules and the ether oxygens of the PEO chains. The water dipoles are thus associated with PEO in such a way as to lose some degrees of freedom, e.g., rotational degrees of freedom. Even though PEO is considered a nonionic polymer, the existence of these electric water dipoles along its chain length makes it a good candidate for occupying the inner Helmholtz plane of the electric double layer on the solid/liquid interface. Unlike the outer Helmholtz plane which is usually occupied by the counterions (e.g., cations in the case of negatively charged interfaces), the inner Helmholtz plane represents the plane of closest approach of anions and water dipoles. PEO is thus able to penetrate the double layer and neutralize the intrinsic charge on the rock surface, thereby acting as an "anchor polymer". The same mechanism would apply for other polyalkene oxides, i.e., polypropylene oxide, etc. The positive water dipoles are able to neutralize an intrinsic negative charge on a rock while the negative water dipoles are able to neutralize an intrinsic positive charge on a sample.

PEO is unique compared to the cationic additives, because increases in PEO concentration beyond that necessary for surface charge neutralization do not result in a positive surface charge, i.e., the ZSC condition is maintained at higher PEO solution concentrations. In this case the maximum drilling performance was obtained at all concentrations tested that produced the ZSC condition. Thus, controlling the drill fluid additive concentration is much less critical.

For application in rock drilling, common, state-of-the-art, percussive, rotary tricone, or diamond drills are employed that either remove drilling particulates with a continuous water flush or with an air flush using a fine water mist. The concentration solution of the water-soluble, high-molecular-weight, nonionic polymer is prepared in a mixing tank using the available mine water and an amount of a nonionic polymer such as PEO that will result in a solution concentration that produces the desired ZSC condition. When drilling with air flush, a mist of the ZSC polymer solution replaces the water mist injected through the bit for dust suppression. When drilling with a water flush, the polymer solution is routed through the drill steel and injected through the bit at the bottom of the drill hole. If the drilling fluid is to be recycled, it is collected in a sump pond wherein rock particulates and sediment are removed by settling and the clarified drilling fluid is returned to the mixing tank for addition of the required makeup amount of PEO to produce the desired ZSC concentration solution. Because PEO acts as a flocculant or coagulant, ponding of drilling fluid will automatically clarify the sump pond solution for recycle as the flocculated drill particulates will settle to the bottom of the pond. The PEO concentration of the clarified sump pond solution and mixing tank solution can be determined by analyzing for total carbon present in the solution. The concentration of water-soluble anionic and cationic oils added to the drilling fluid for lubrication purposes can be eliminated or at least reduced by drilling with PEO solutions. PEO has lubricating properties of its own which can eliminate the need for other lubricating additives. Also, PEO will attract the cationic and anionic water-soluble oil molecules and concentrate them at rock, drill bit and drill steel surfaces, thereby reducing the concentration of these oils needed in the bulk solution.

For application in tunneling, common, state-of-the-art, tunneling machines are employed that lubricate the bits or cutting discs and flush out particulates with a circulating liquid. The ZSC polymer solution is prepared in a mixing tank using the available mine water and an amount of a nonionic polymer like PEO that will result in a solution concentration that produces the desired ZSC condition. When tunneling, the ZSC polymer solution is circulated through the bits or cutting discs on the machine and injected at the rock face being excavated. If the tunneling fluid is to be recycled, it is collected in a sump pond wherein rock particulates and sediment are removed by settling and the clarified drilling fluid is returned to the mixing tank for addition of the required amount of PEO to produce the desired ZSC concentration solution. The PEO concentration of the clarified sump pond solution and mixing tank solution can be determined by analyzing for total carbon present in the solution.

For application in rock cutting, common, state-of-the-art, cutting tools such as diamond saws and wire saws are employed that use a circulating liquid to flush out cuttings and lubricate the blades. The ZSC polymer solution is prepared in a mixing tank using the available quarry water and an amount of a nonionic polymer like PEO that will result in a solution concentration that produces the desired ZSC condition. When cutting, jets of the polymer solution are focused on the blade-rock interface at the area of cutting. The clarified drilling fluid is returned to the mixing tank for addition of the required makeup amount of PEO to produce the desired ZSC concentration, after rock particulates and sediment are removed by settling. The PEO concentration of the clarified solution and mixing tank solution can be determined by analyzing for total carbon present in the solution. The concentration of water-soluble anionic and cationic oils added to the cutting fluid for lubrication purposes can be eliminated or at least reduced by cutting with PEO solutions. PEO has lubricating properties of its own which can eliminate the need for other lubricating additives. Also, PEO will attract the cationic and anionic water-soluble oil molecules and concentrate them at rock, and cutting tool surfaces, thereby reducing the concentration of these oils needed in the bulk solution.

For application in grinding, common, state-of-the-art, rod mills and ball mills are employed that operate on a continous basis. The coarse ore is slurried with the polymer solution (grinding water) and introduced into the grinding mill. The ZSC polymer solution is best prepared by dosing proper amounts of a concentrated solution of PEO into the grinding water source, whether it be fresh or recycled water. The concentrations of PEO in the clarified recycled water and the grinding water are determined indirectly by measuring the viscosities of these waters, finding these values on the viscosity versus concentration calibration curve, and reading the corresponding concentrations from the graph. Alternatively, the PEO concentration of clarified grinding fluid can be determined by analyzing for total carbon in the solution. The slurry of ground ore is filtered and the filtrate is recycled for PEO concentration adjustment before again being slurried with the coarse ore.

For application in coal cutting, common, state-of-the-art, cutting drums and plows are employed that use water sprays for dust reduction. The ZSC polymer solution is prepared in a mixing tank using the available quarry water and an amount of a nonionic polymer like PEO that will result in a solution concentration that produces the desired ZSC condition. When cutting, the ZSC polymer solution is sprayed on the coal surface instead of water. Dust reduction is likely to be accomplished due to the following mechanisms: (1) in cutting the coal with water-soluble, high-molecular-weight nonionic polymer solutions cracking occurs more continously instead of catastrophically; the former resulting in the generation of more large coal particles and less respirable dust, (2) in cutting coal, sharper bits produce less dust and since the nonionic polymer solutions retard bit and plow wear, cutting coal with these solutions will produce less respirable dust, and (3) the combination of the polymer's nonionic character and polymer's molecular bridging characteristics causes generated respirable dust to become agglomerated and stick to larger coal fragments. In addition to the improved coal cutting, improved bit life, and improved dust suppression obtained when cutting coal with ZSC concentration of polymer solutions such as PEO solutions, another benefit is obtained if the cut coal is to be slurry transported in a pipeline. This benefit is the enhancement of the hydrodynamic flow rate of the coal slurry in the pipeline owing to the lubricative properties of the polymer (PEO).

For application in dust suppression during drilling, tunneling, and cutting of solids other than coal, a ZSC concentration polymer solution replaces water in the flushing fluids, sprays and air-fluid mists normally used for dust reduction. The ZSC polymer solution is prepared in a mixing tank using the available mine water and an amount of a nonionic polymer like PEO that will result in a solution concentration that produces the desired ZSC condition. The mechanisms for dust suppression when drilling, tunneling, and cutting other solids is similar to those listed above for cutting coal.

For application in permeability enhancement, common, state of the art, hydrofracing methods are employed except that a ZSC concentration polymer solution replaces water as the hydrofracing fluid. The ZSC polymer solution is prepared in a mixing tank using the available mine water and an amount of a nonionic polymer like PEO that will result in a solution concentration that produces the desired ZSC condition. The ZSC concentration polymer solution, like the water in conventional hydrofracing, is introduced under pressure into injection wells in the rock formation to produce more fractures radiating from the well and thus improving permeability.

EXAMPLE I

Determination of the ZSC Concentration(s)

A ZSC concentration is an additive concentration that results in the neutralization of rock surface charges and brings the rock fragments to zero zeta potential. Zeta potential determinations were made on a Komline-Sanderson Model ZR-11 Zeta Reader. Rock fragments (about 0.2 gm) of minus 147 micron (minus 100 mesh) size were added to a stirred reservoir containing 1000 ml of the baseline water (distilled-deionized, tap, mine or mill). Inlet and outlet tubes from the zeta reader were introduced into the reservoir to allow the slurry of rock particles to be pumped into and out of the electrophoresis cell for determination of the zeta potential of the rock in the baseline water. The zeta reader uses a miniature television camera to display on the unit's video monitor the rock particle movement in the electrophoresis cell under an applied electric field of 10 volts per cm (V/cm). The potential of the rock particle was determined by matching the speed of a moving grid line (also displayed on the video monitor) to the speed of a rock particle using a balance potentiometer. The zeta potential was then read in millivolts (mV) on the unit's digital readout. Thirty readings were taken to get a statistically-valid average and standard deviation.

After the thirty zeta potential readings were recorded for a given rock in the baseline water (which were notably initially negative), a small precise dose of a concentrated additive stock solution was added to the reservoir and thirty readings were taken. Concentration of the additive was incrementally increased in this manner and thirty readings taken after each addition until several of the zeta potential readings were positive in the case of cationic additives or the concentration was 125 ppm in the case of PEO. Three complete sets of tests were run for each additive/rock combination and a graph of average zeta potential versus concentration plotted for each combination. The zero surface charge (ZSC) concentration(s) were taken to be the concentration at which the zeta potential plot intersected the zero potential line (cationic additives) or for PEO, the concentrations at which the zeta potential curve fell continually on the zero potential line.

Figure 2:
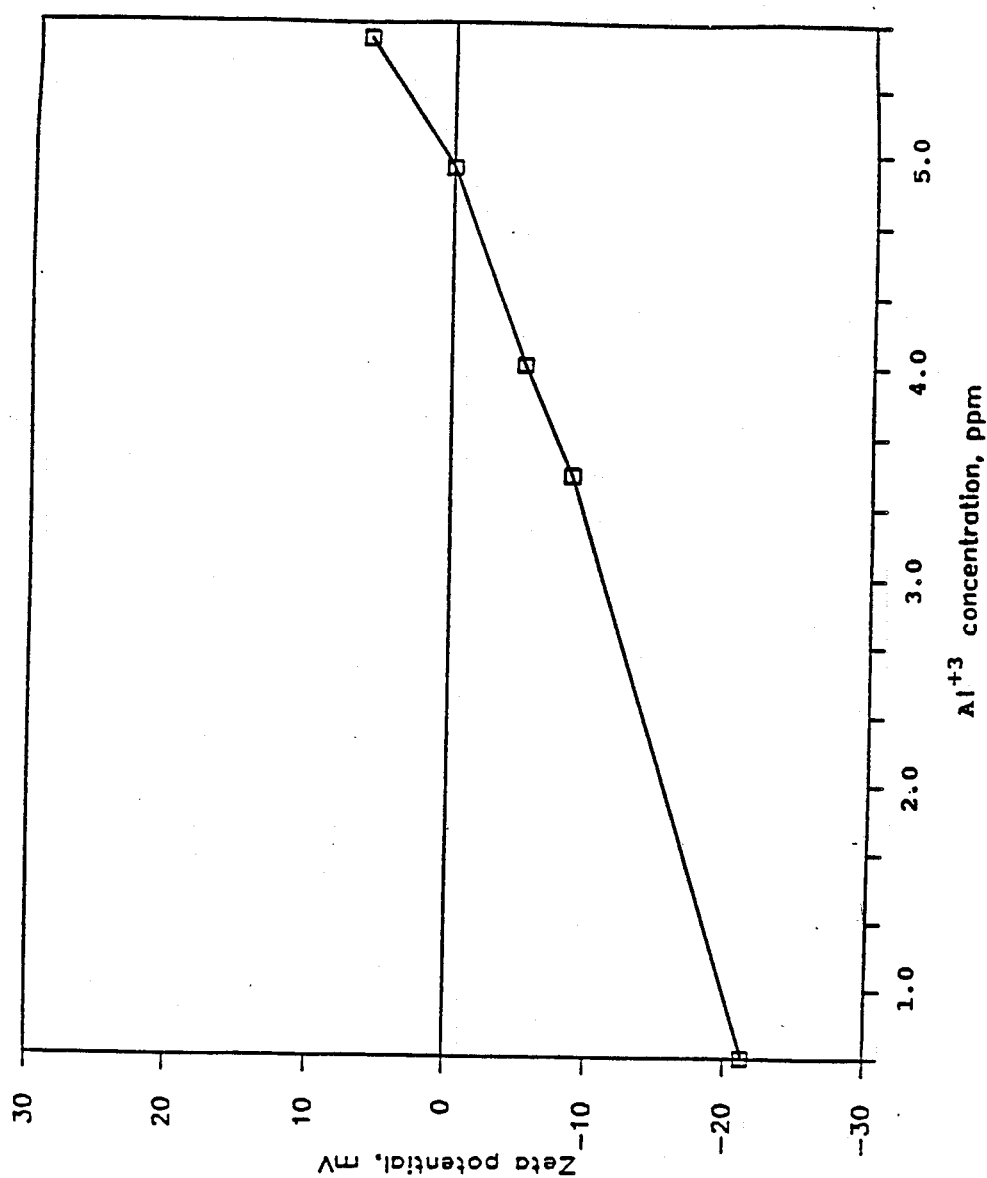
FIG. 2. shows the variation of zeta potential with additive concentration for Sioux Quartzite in $AlCl_3$ solutions.

FIG. 1 shows the variation of zeta potential with additive concentration for Sioux Quartzite particles in PEO solutions, while FIG. 2 shows this variation for Sioux Quartzite particles in solutions of $AlCl_3$ in acidified tap water. The unexpected wide range of ZSC concentrations typical for the high-molecular-weight, nonionic polymers in this invention and depicted in FIG. 1 is clearly contrasted to the singular ZSC concentration typical for the cationic additives demonstrated previously and depicted in FIG. 2 for $AlCl_3$ in acidified tap water.

EXAMPLE II

Maximized Drilling Penetration Rate at ZSC Concentration(s)

Drilling tests were conducted on a Houdaille Powermatic (1.13Kw or 1 ½ Hp) DC-controlled, variable-speed, industrial drill press adapted to use 16mm (⅝ in) diamond-impregnated coring bits. The bit rotational speed was 100 rev/min under 150 kg total load. Drilling fluid was pumped through the bit at a rate of 150 ml/min. Drilling in refractory fireclay brick, prior to each test, honed the bit to a sharpness corresponding to an initial average penetration rate of 4.5 mm/min.

Tests consisted of randomly drilling as many 12.7 cm (5 in) deep holes in a 15.2 cm (6 in) cube of rock as was necessary to dull the bit to a final "dull" state corresponding to an average penetration rate of 2.0 mm/min or less. Penetration of the bit was measured using a DC-to-DC linear variable differential transformer (LVDT). The output of the LVDT was connected to an analog-to-digital converter (ISAAC 91A computer interface), which sent the digitized signals to an Apple IIe microcomputer. The computer was programmed to determine the change in displacement from the LVDT output and to compute a new penetration rate every minute. An Epson MX-100 printer was used to record time (min), displacement (mm) and penetration rate (mm/min) every minute and total time, total displacement, and average penetration rate for each hole. Total penetration for drilling with either additive solutions or with the baseline water alone was the sum of the total displacements for all holes drilled in dulling the drill bit from the 4.5 mm/min "sharp" state to the 2.0 mm/min "dull" state.

The percent penetration effect for the additive was calculated as the difference between the total penetration (in mm) of drilling with the additive and with the baseline water alone, divided by the total penetration with the baseline water alone, and multiplied by 100.

Figure 3:
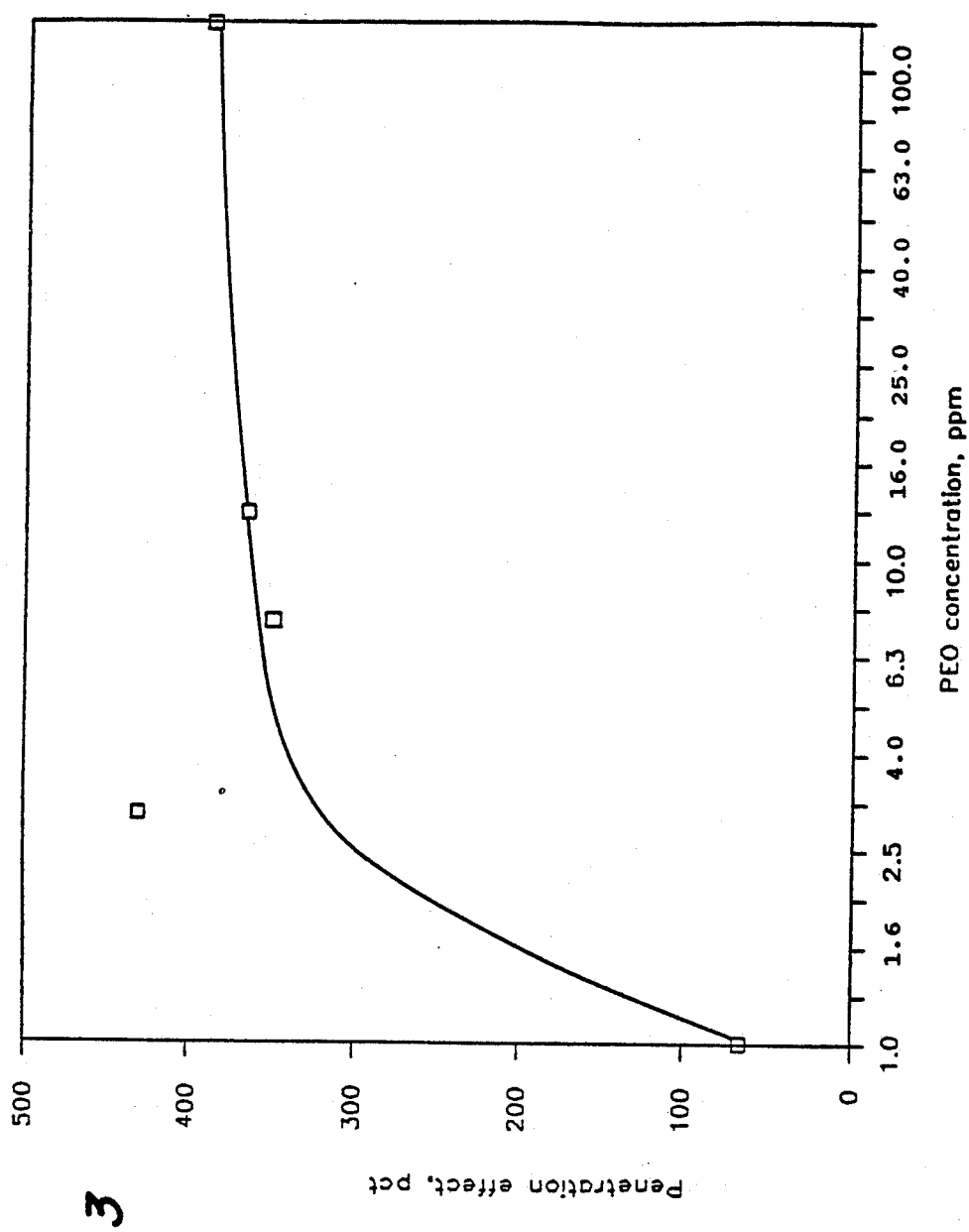
FIG. 3. shows the variation of the penetration effect with additive concentration for drilling Sioux Quartzite with PEO solutions.
Figure 4:
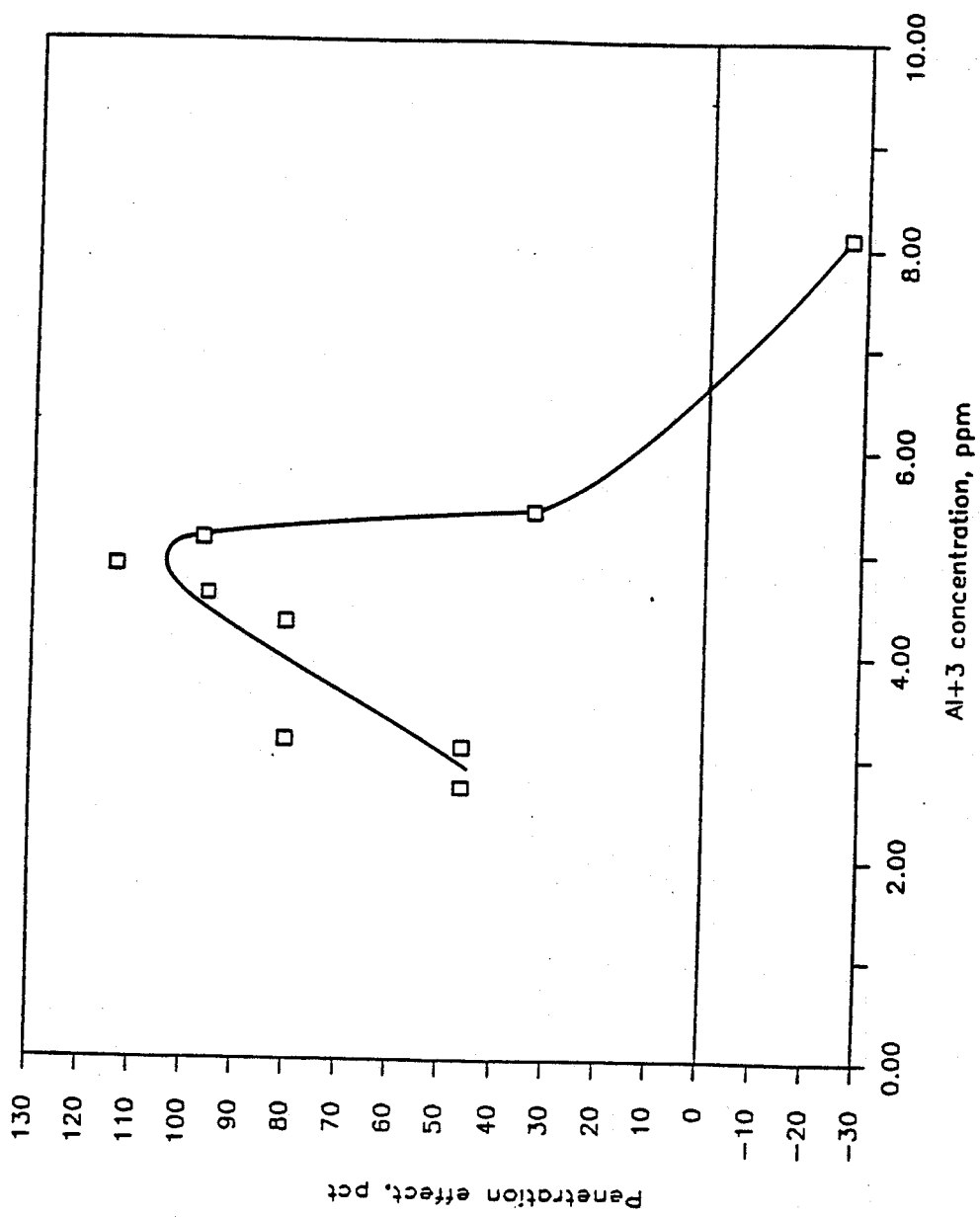
FIG. 4. shows the variation of the penetration effect with additive concentration for drilling Sioux Quartzite with $AlCl_3$ solutions.

FIG. 3 shows the variation of the penetration effect with additive concentration for drilling Sioux Quartzite with PEO solutions as drilling fluids, while FIG. 4 shows this variation for drilling Sioux Quartzite with solutions of $AlCl_3$ in acidified tapwater as drilling fluids. Comparing the concentrations in FIGS. 3 and 4 which result in a maximum penetration effect with the concentration in FIGS. 1 and 2, respectively, that produce the ZSC condition, shows that the maximum penetration effect is obtained at a ZSC concentration. Contrasting FIG. 3 with FIG. 4 clearly shows the advantages of the nonionic polymers of this invention over the cationic additives used previously. First, a penetration effect of over 350 pct is attained with the polymer compared to the penetration effect of around 100 pct attained with the cationic additive; a three-and-one-half-fold improvement in penetration effect. Second, there is a wide range of concentrations of the polymer (3 to 125 ppm) that produce a maximum penetration effect of 350 pct or greater, compared to the singular concentration of cationic additive that produces a maximum penetration effect around 100 pct. Also, $Al^{3+}$ ions hydrolyzes to $Al(OH)_3$ in naturally occurring tap water and mine water solutions above pH 4.5. Such hydrolysis renders $Al^{3+}$ ions ineffective in producing surface charge alterations. PEO does not and hydrolyze and therefore its performance as a surface charge neutralizer is not affected by a wide range of pH in waters.

EXAMPLE III

Maximized Bit Life Extension at ZSC Concentration(s)

Total time for drilling with either additive solutions or with water alone was the sum of the total times for all holes drilled in dulling the drill bit from the 4.5 mm/min "sharp" state to the 2.0 mm/min "dull" state.

The percent bit life effect for the additive was calculated as the difference between the total time (in min) of drilling with the additive and with water alone, divided by the total time with water alone, and multiplied by 100.

Figure 5:
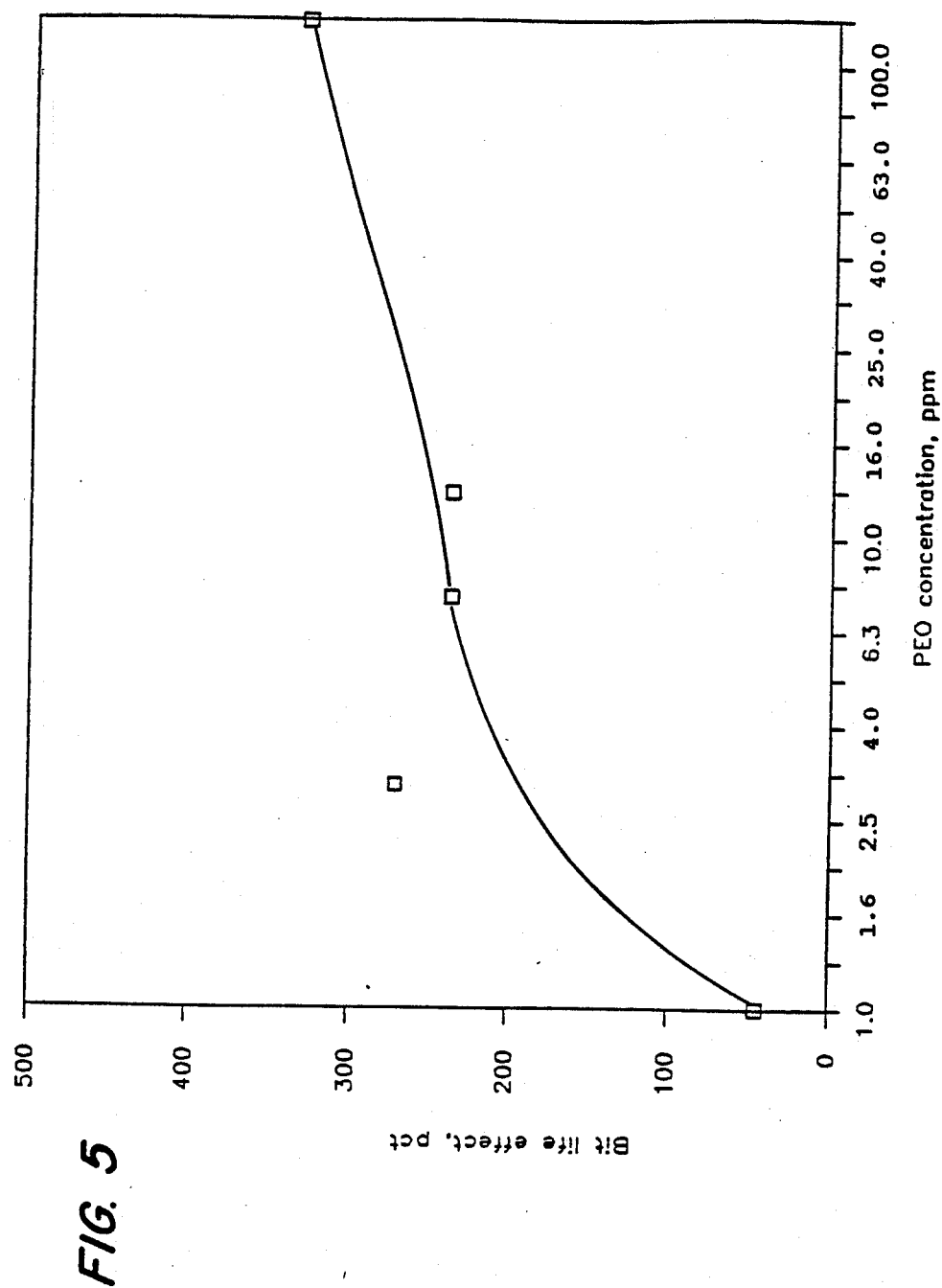
FIG. 5. shows the variation of the bit life effect with additive concentration for drilling Sioux Quartzite with PEO solutions.
Figure 6:
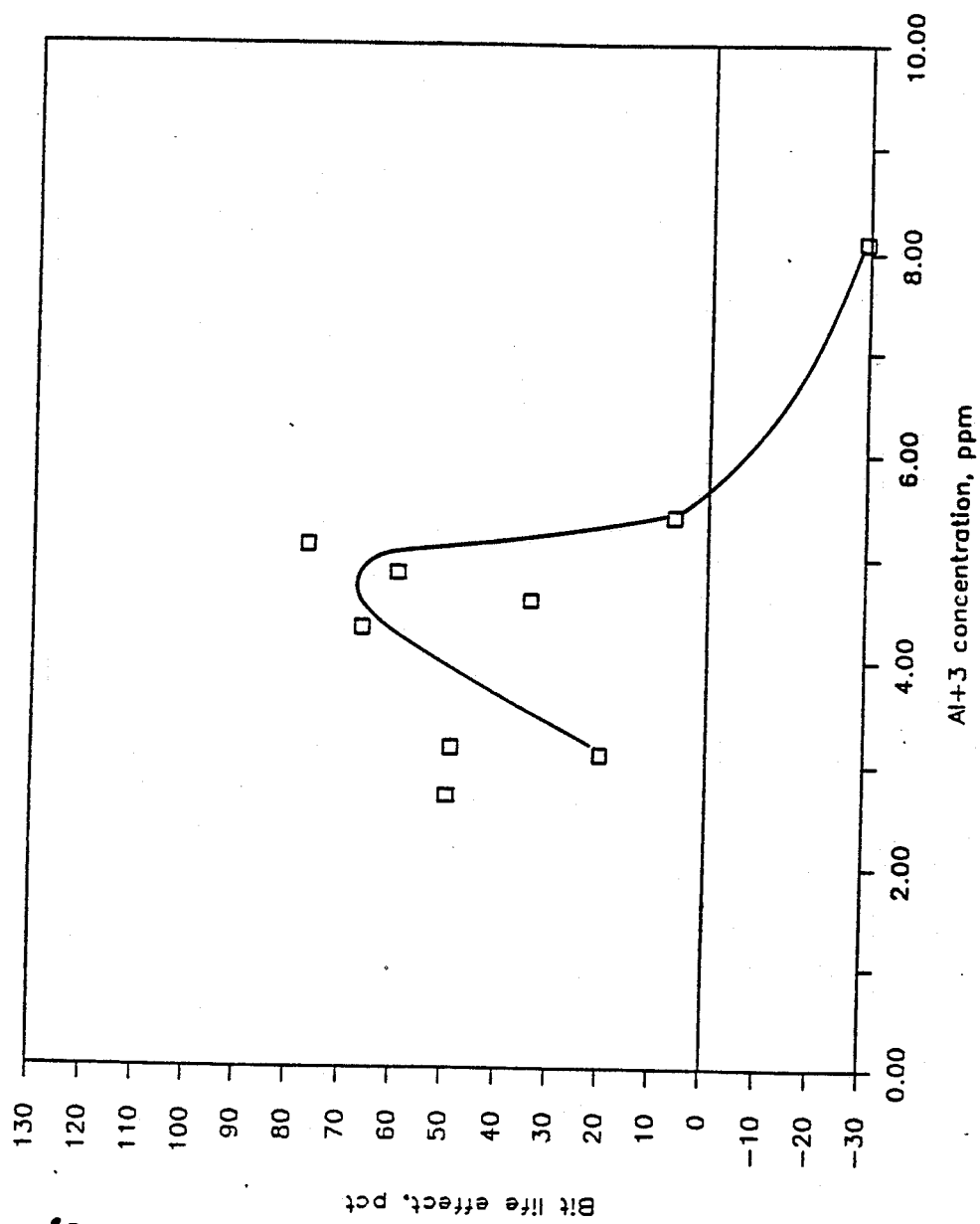
FIG. 6. shows the variation of the bit life effect with additive concentration for drilling Sioux Quartzite with $AlCl_3$ solutions.

FIG. 5 shows the variation of the bit life effect with additive concentration for drilling Sioux Quartzite with PEO solutions as drilling fluids, while FIG. 6 shows this variation for drilling Sioux Quartzite with solutions of $AlCl_3$ in acidified tap water as drilling fluids. Comparing the concentrations in FIGS. 5 and 6 that result in a maximum bit life effect with the concentrations in FIGS. 1 and 2, respectively, that produce the ZSC condition shows that the maximum bit life effect is obtained at a ZSC concentration. Contrasting FIG. 5 with FIG. 6 again clearly shows the advantages of the water-soluble, high-molecular-weight, nonionic polymers over the cationic additives described previously. First a bit life effect of over 235 pct is attained with the polymer compared to the bit life effect of around 100 percent attained with the cationic additive; a two-fold plus improvement in bit life effect. Second, there is a wide range of concentrations of the polymer (3 to 125 ppm) that produce a maximum bit life effect of 235 pct or greater, compared to the singular concentration of cationic additive that produces a maximum bit life effect around 100 pct.

EXAMPLE IV

Effect of ZSC Concentration of Polymer on Cutting Performance

Cutting tests were made on South Dakota Mahogany Granite with a 71-cm-diameter (28-inch-diameter) diamond saw comparing the usage of three cutting fluids; water alone, water with a ½ pct ZEP LUBEEZE brand cutting oil (a fatty animal oil), and a 15 ppm solution of PEO. The PEO solution was prepared by adding a sufficient quantity of a concentrated PEO solution to 2,300 gallons of water to make the 15 ppm solution. The cutting oil solution was prepared by adding enough of the animal-base oil to the 2,300 gallons to make a ½ pct solution. The cutting fluid was sprayed at the blade/rock interface, collected, clarified, and recycled for reuse as the cutting fluid.

With the cutting results for water alone as the baseline, preliminary cutting performance results with the ZSC concentration PEO solution showed a 230 pct increase in penetration effect, while the cutting oil produced only a 67 pct increase in penetration effect. PEO solution as a cutting fluid is advantageous over the fatty animal oil because it not only results in more penetration per time than the cutting oil, but is less costly and doesn't become rancid with time. In fact, PEO is a nontoxic compound that is slowly biodegradable and is used in the food and beverage industry and in the preparation of denture adhesives. Furthermore, a smoother cut was made using ZSC PEO solutions as the cutting fluid compared to either water alone or with soluble fatty animal oil as the cutting fluid, thereby indicating that ZSC PEO solutions enhance the rock cracking and thus fragmentation radially, in the direction of the cut, and less on the fragmentation laterally, perpendicular to the cut. Furthermore, the amount of water soluble oil needed in the cutting fluid for lubrication was reduced from 7 barrels every 5 weeks without PEO addition to 1 barrel every 5 weeks with PEO addition.

TABLE 1

Grinding test results on Minnesota taconite

| Size Fraction U.S. Mesh Size | Water Alone | | PEO Solution | |
|---|---|---|---|---|
| | Percent | Cumulative Percent Passing | Percent | Cumulative Percent Passing |
| −12 +16 | 0.02 | 100.00 | 0.01 | 100.00 |
| −16 +20 | 0.59 | 99.98 | 0.39 | 99.99 |
| −20 +30 | 5.13 | 99.39 | 2.36 | 99.60 |
| −30 +40 | 17.66 | 94.26 | 13.44 | 97.24 |
| −40 +50 | 23.29 | 76.60 | 21.90 | 83.80 |
| −50 +60 | 8.65 | 53.31 | 10.79 | 61.90 |
| −60 +70 | 5.50 | 44.66 | 5.65 | 51.11 |
| −70 +100 | 7.62 | 39.16 | 8.60 | 45.46 |
| −100 +150 | 6.46 | 31.54 | 6.92 | 36.86 |
| −150 +200 | 4.28 | 25.08 | 4.74 | 29.96 |
| −200 +270 | 5.02 | 20.80 | 3.68 | 25.20 |
| −270 +325 | 2.82 | 15.78 | 1.99 | 21.52 |
| −325 +400 | 1.84 | 12.96 | 2.38 | 19.53 |
| −400 +500 | 1.85 | 11.12 | 2.16 | 17.15 |
| −500 | 9.27 | 9.27 | 14.99 | 14.99 |
| Total | 100 | | 100 | |

EXAMPLE V

Effect of ZSC Concentration of Polymer on Grinding

Two laboratory grinding tests were made on Minnesota Taconite using distilled, deionized water alone, and a 100 ppm PEO solution. The PEO solution was prepared by adding sufficient PEO to distilled, deionized water to make the 100 ppm solution. For each test 600 grams of taconite, and 600 ml of grinding fluid were rotated at 60 RPM in a closed laboratory rod mill with 26 rods for 5 minutes. At the end of the tests the ground products were wet screened, dried, and weighed. Initially, the taconite sample consisted of 39.0 pct minus 10 mesh, plus 16 mesh; 21.6 pct minus 16 mesh plus 20 mesh; 14.9 pct minus 20 mesh, plus 30 mesh; and 24.5 pct minus 30, plus 50 mesh material. The pH of both the water alone and PEO solution before and after grinding were 5.5 and 8.2, respectively.

Figure 7:
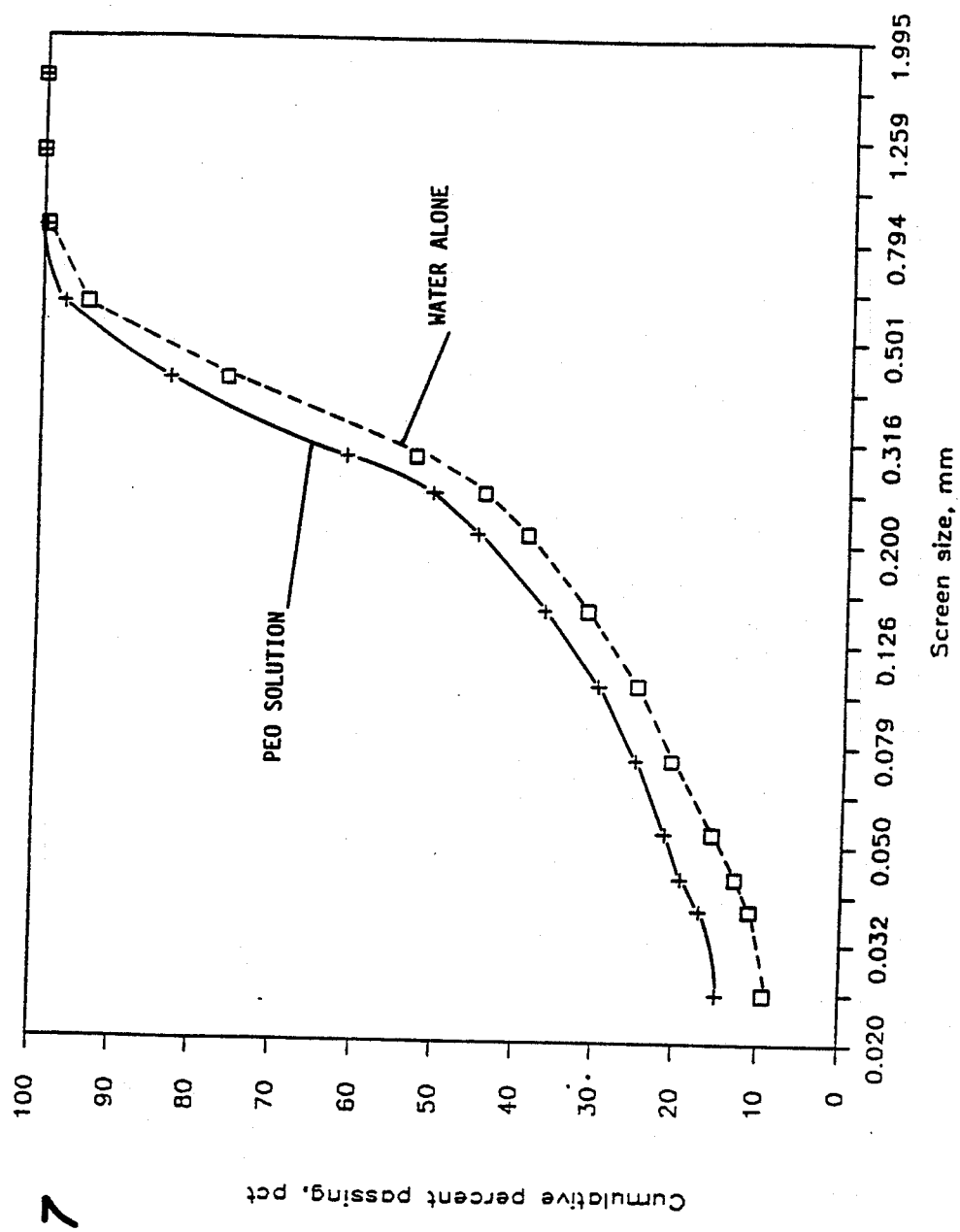
FIG. 7. shows the results of grinding tests on Minnesota Taconite and a PEO solution.

The results of the grinding tests are plotted in FIG. 7 and tabulated in table 1. The grinding of taconite with PEO solutions resulted in more finer material, thereby indicating that grinding with PEO solutions results in increased comminution. Comparison of individual size fractions for the two grinding tests indicates a bimodal distribution of particles through the size fractions, i.e. −12+50 mesh: 7.2 pct more material for grinding with water alone; −50+200 mesh: 4.2 pct more material for PEO grinding; −200+325 mesh: 2.2 pct more material for grinding with water alone; and −325 mesh: 11.6 pct more material for PEO grinding. This is believed due to the difference in grindability of the two components of the taconite ore, the harder chert and the softer magnetite; the coarser two fractions (−12+50 mesh and −50+200 mesh) show that PEO aids in comminution of the chert, while the finer two size fractions (−200+325 mesh and −325 mesh) show that PEO aids in comminution of the magnetite.

EXAMPLE VI

Improved Field Drilling Performance

Fifteen (15) inch diameter rotary tricone bits were used to drill 50-ft deep blastholes in Minnesota Taconite in Northern Minnesota. Drilling performances were compared for air-mist application of water alone and for air-mist application of ZSC concentration PEO solutions. Drilling penetration rate averaged 0.55 ft/min when drilling with water alone and 0.93 ft/min when drilling with ZSC concentration PEO solutions, an increase in penetration rate of 70 pct. Bit life averaged 2700 feet for the bits used when drilling with water alone and 3400 ft for bits drilled with ZSC concentration PEO solutions, an increase of 25 pct. In addition, when drilling with mist of ZSC concentration PEO solutions, the amount of dust around the drill was drastically reduced.

What is claimed is:

1. A method of increasing the fragmentation rate and prolonging the life of a bit, cutting tool, grinding media, or polishing tool at constant applied stress during drilling, tunneling, cutting grinding, or polishing, comprising the steps of:
   determining the zero surface charge concentration of a flushing, grinding, or polishing fluid for a solid; and
   adding the requisite amount of a material, selected from the group consisting of water-soluble, high-molecular-weight, nonionic polymers consisting of polyethylene oxide (PEO), necessary to produce charge-neutralizing positive charge dipoles.

2. A method of increasing the fragmentation rate and prolonging the life of a bit, cutting tool, grinding media, or polishing tool at constant applied stress during drilling, tunneling, cutting, grinding, or polishing, comprising the steps of:
   determining the zero surface charge concentration of a flushing, grinding, or polishing fluid for a solid; and
   adding the requisite amount of a material selected from the group consisting of water-soluble, high-molecular-weight, nonionic polyalkene oxide polymers.

3. A method as claimed in claim 2 wherein said material consists of polyethylene oxide (PEO).

4. A method of decreasing the concentration of anionic or cationic water-soluble oils in drilling and cutting fluids requisite for lubrication of drill bits, drill steel and cutting tools while increasing the drilling or cutting rate comprising the steps of:
   determining the minimum concentration of a water-soluble oil needed for lubrication in a drilling or cutting fluid containing a material selected from the group consisting of watersoluble, high-molecular-weight, non-ionic polymers;
   determining the zero surface charge (ZSC) concentration of the material selected from the group consisting of water-soluble, high-molecular-weight, nonionic polymers in a drilling or cutting fluid for a solid when the fluid contains the water-soluble oil; and
   adding the requisite amount of a material selected from the group consisting of water-soluble, high-molecular-weight, nonionic polyalkene oxide polymers.

5. A method as claimed in claim 4 wherein said material consists of polyethylene oxide.

* * * * *